United States Patent [19]

Blanda

[11] Patent Number: 4,799,351
[45] Date of Patent: Jan. 24, 1989

[54] PROCESS AND APPARATUS FOR TURNING HEAD TO FOOT AND PACKING DISSYMMETRICAL OBLONG BODIES

[75] Inventor: Guy Blanda, Guitres, France
[73] Assignee: Sanofi, Paris, France
[21] Appl. No.: 92,572
[22] Filed: Sep. 3, 1987
[30] Foreign Application Priority Data Sep. 3, 1986 [FR] France ............................. 86 12391

[51] Int. Cl.⁴ ......................... B65B 35/56; B65B 35/54
[52] U.S. Cl. ....................................... 53/446; 53/143; 198/402
[58] Field of Search ................. 53/444, 446, 143, 475, 53/247; 198/379, 380, 402, 403

[56] References Cited

U.S. PATENT DOCUMENTS

| | | | |
|---|---|---|---|
| 2,819,575 | 1/1958 | Ervine | 53/143 |
| 2,848,855 | 8/1958 | Ervine | 53/143 |
| 3,408,926 | 11/1968 | Rogerson | 53/143 X |
| 3,567,008 | 3/1971 | Fischer | 198/402 |
| 4,192,415 | 3/1980 | Krener et al. | 53/143 X |
| 4,246,739 | 1/1981 | Rogerson | 53/446 X |

FOREIGN PATENT DOCUMENTS 2172468  9/1973  France .
105458   7/1963  Netherlands .

OTHER PUBLICATIONS

Metalworking Production, vol. 113, No. 17, Apr. 23, 1969, pp. 58–61, Morgan Grampian Ltd., Londres, GB; "Orientating parts for assembly machines".

Primary Examiner—Horace M. Culver
Attorney, Agent, or Firm—Wegner & Bretschneider

[57] ABSTRACT

According to the invention, bodies are oriented head-to-foot by propelling the bodies and deflecting them onto adjacent guide members so that the bodies on one guide member are inverted with respect to the bodies on the adjacent guide members. The bodies are then guided to a packing station where the bodies are packed head-to-foot so as to maximize the use of space in the package. The apparatus of the invention includes a feed device which holds the bodies vertically with the same orientation. A throwing device propels two adjacent bodies upward, which are deflected by a deflecting device so that one of the bodies lands on a ramp and is oriented in one direction, and the other body lands on a second ramp and is oriented the opposite way. The bodies are then fed to a packing apparatus which packs the bodies head-to-foot.

17 Claims, 7 Drawing Sheets

PROCESS AND APPARATUS FOR TURNING HEAD TO FOOT AND PACKING DISSYMMETRICAL OBLONG BODIES

The present invention relates generally to the packaging and packing of oblong bodies, particularly dissymmetrical bodies comprising one end portion, known as the wide end, which has a section greater than that of the opposite end, known as the thin end.

Oblong bodies of this kind are generally cylindrical bodies having a flattened end portion, for example tubes used in the pharmaceutical, cosmetics or foodstuffs industries, such as ointment tubes, toothpaste tubes, cannula tubes containing a microenemas, and the like.

In order to achieve safe packing in a package of small dimensions, and thus to protect the packed products against all risk of damage or deterioration, it is necessary during the packing operation to invert alternate bodies being packed, in such a manner as to dispose them head to foot in each bed or layer in order to compensate for the difference in section of the ends of these bodies.

This inversion is generally effected by hand during the packing, which is done at a receiving station continuously fed from a machine producing the oblong bodies filled with their contents.

A method of this kind if out of the question for high-output units, because in such cases it is necessary to provide more than one operator for a single receiving station in order to absorb the output of the production machine. The problem of accommodating the receiving station then arises, since its size increases with the number of operators working in it.

The present invention seeks to solve this problem by providing a process and an apparatus enabling the inversion of the oblong bodies to be effected automatically direct at the outlet of the production machine, upstream of the packing station, and then automatically packing these inverted bodies head to foot in the packages.

In addition to the resulting higher working rate, the invention offers the advantage of reducing the cost of packing and improving the quality and uniformity of this operation, while providing units which can be installed anywhere with minimum floor space requirements.

In order to achieve this aim, according to the invention the process comprises:
vertically throwing two of the bodies fed and deflecting them to direct the thin end of one of them towards the left and the thin end of the other towards the right,
allowing these bodies thus directed oppositely to one another to fall onto guide members, and
guiding them side by side and thus directed head to foot to a packing station.

The bodies are preferably deflected on the same side outside the device which feeds them.

At the end of the guiding after the bodies have fallen, the process further comprises:
realigning parallel to one another the bodies of each pair thus delivered head to foot, by vibrating them independently of one another in relation to a positioning member, and depositing them in movable conveying means while leaving free spaces between them, and
transferring the similarly directed first bodies from one of said means to a package and the oppositely similarly directed second bodies into the free spaces existing between the first bodies in the package.

The invention additionally extends to a stowing apparatus for applying the abovedescribed process, comprising:
a feed apparatus vertically supporting the bodies with the same orientation,
a throwing and deflecting station coming into action simultaneously on at least one pair of bodies delivered by the feed apparatus to distribute them head to foot,
at least one pair of inclined reception ramps, and
a packing apparatus.

In a particularly advantageous embodiment the throwing and deflecting station comprises at least two vertical impulsion devices, such as compressed air nozzles, jacks, or other means, and at least two deflecting devices disposed facing one another respectively below and above the feed device, each deflecting device coming into action in the direction of the corresponding inclined reception ramp to release each deflected oblong body in free fall above said ramp.

The throwing and deflecting station preferably comprises a resiliently closing, controlled opening pivoting gripper and a fixed concave ramp, which are disposed in such a manner that the trajectories of the oblong bodies are oriented in the same direction towards the outside of the feed device, which is preferably in the form of a turntable, and above two contiguous inclined ramps having the same slope.

The stowing apparatus may also comprise, between each of the inclined ramps delivering the bodies head to foot and the packing apparatus, a transfer device in the form of an elevating plate which in its top position is served in particular by the respective inclined ramp and is connected to a vibrator enabling each oblong body arriving on it to be realigned in a positioning means on the plate, and which in its bottom position deposits said body on a conveyor in the packing apparatus.

For the purpose of inclining the oblong bodies and supporting their ends each conveyor for oblong bodies in the packing apparatus is provided, along one edge, with notches receiving the thin ends of said bodies and, along the opposite edge, with slopes affecting the inclination.

Between the conveyors for oblong bodies and a conveyor for packages which extends between them, the packing device is provided with movable manipulator arms each having a gripping means, such as a vacuum suction cup, making it possible to pick up a plurality of bodies from the corresponding conveyor, to displace them, and to deposit them in the "head" spaces in a package which are provided for the purpose and are separated by "foot" spaces in which the bodies from the other conveyor are deposited by the other manipulator arm.

Various other characteristics and advantages of the invention will be moreover apparent from the following detailed description.

One embodiment of the invention and variants thereof are illustrared as non-limitative examples, in the accompanying drawings, in which.

Figure 1:
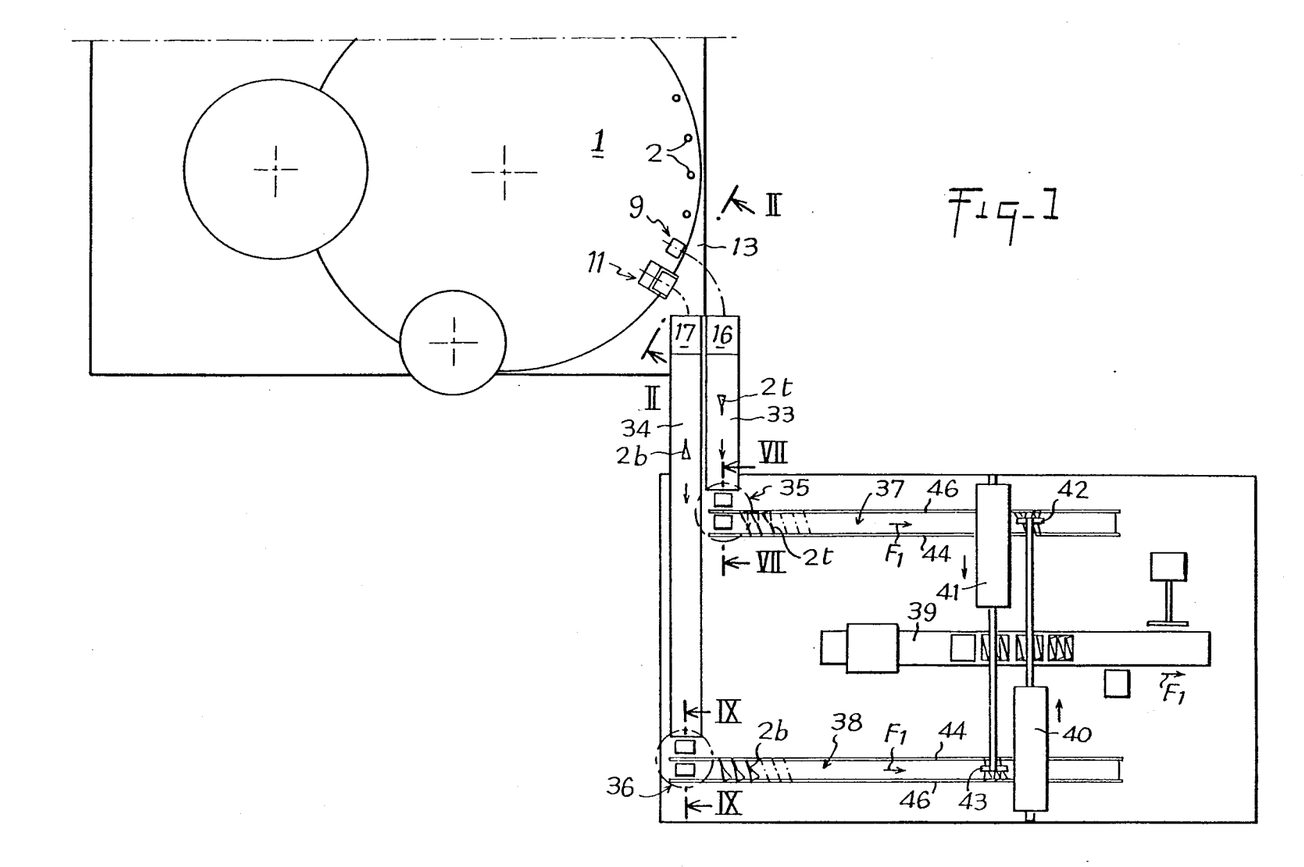
FIG. 1 is a schematic plan view showing an installation utilizing the stowing apparatus according to the invention.
Figure 3:
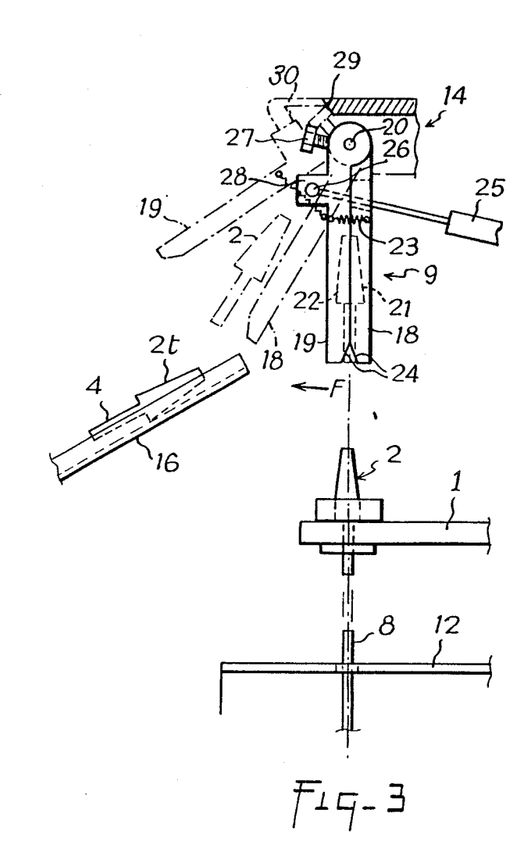
FIGS. 3 and 4 are side elevations taken on the lines III—III and IV—IV respectively in FIG. 2, and showing two separate superposable views of a set of two throwing and deflecting devices adapted to operate simultaneously on two neighbouring bodies delivered opposite one another by the feed device.
Figure 4:
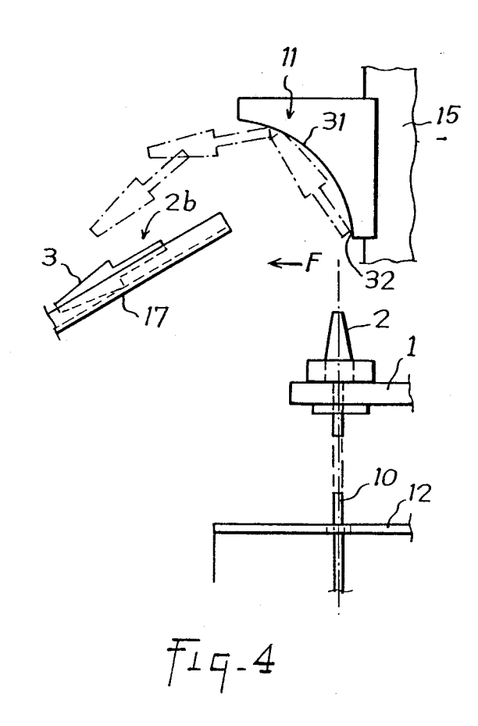

1 designates a turntable of a machine for filling oblong bodies 2, which in the example illustrated consist of cannula tubes intended to contain microenemas. At one end 3, known as the wide end, each body 2 is flattened and at its other end 4, known as the thin end, the body in question is shaped as a cannula. An oblong body 2 of this type is dissymmetrical and, when when it is filled and it falls, it becomes oriented in relation to its centre of gravity in such a manner as to tend to resume its position of stable equilibrium. This phenomenon is utilized to achieve the effect that two contiguous bodies $2t$ and $2b$, when suitably thrown up and deflected, will arrive head to foot on inclined ramps, one of them, $2t$, with its thin end 4 at the front and the other, $2b$, with its wide end 3 at the front (FIGS. 3 and 4).

Figure 2:
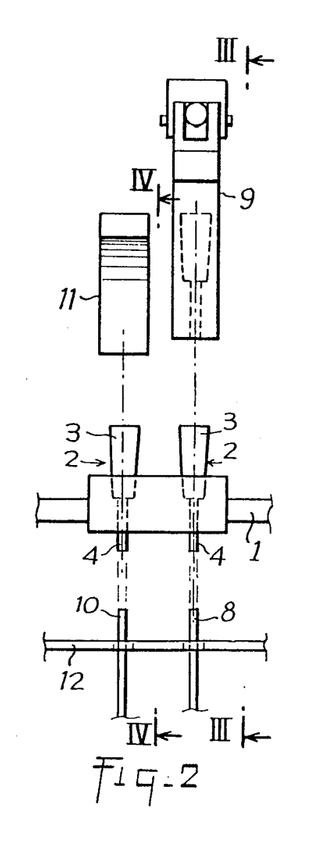
FIG. 2 is a front elevation taken on a larger scale on the line II—II in FIG. 1, illustrating one form of construction of the throwing and deflecting apparatus used in the packing apparatus.

It is important to observe that the bodies 2 are arranged side by side on the periphery of the turntable 1 and extend vertically with the same orientation, for example—as can be seen in FIG. 2—with the wide end 3 at the top.

Figure 13:
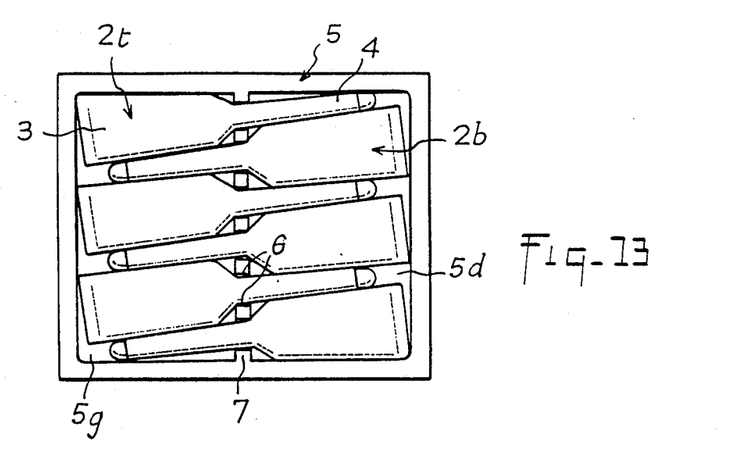
FIG. 13 is a top plan view of a package filled with oblong bodies arranged head to foot.

The stowing apparatus described below makes it possible for bodies 2 to be automatically manipulated from the turntable 1 so as to be placed head to foot in a package 5 (FIG. 13). Thus, considering two bodies 2 to be taken simultaneously from the turntable 1 (FIG. 2), the process consists in throwing them upwards and deflecting then so as to direct the thin end 4 of one of them, $2t$, towards the left (FIG. 3) and that of the other, $2b$, towards the right (FIG. 4), then allowing them to fall, while retaining this orientation, onto guide members so that the body $2b$ will advance with its thin end 4 at the front (FIG. 3) and the body $2b$ will advance with its thin end 4 at the back, these bodies $2t$ and $2b$ then moving along head to foot. In order to shorten the description, the body $2t$ will hereinafter be referred to as the "head" body and the body $2b$ as the "foot" body. After manipulation of the bodies $2t$ and $2b$ thus inverted, the bodies $2t$ are disposed in the package 5 with their wide ends 3 situated in the left-hand space $5g$ in the package and separated by the thin ends 4 of the bodies $2b$, whose wide ends 3 are placed in the right-hand space $5d$ in said package and separated by the thin ends 4 of said bodies $2t$; the thin ends 4 of all the bodies are centered in notches 5 in a rib 6 in the package, said rib delimiting the spaces $5g$ and $5d$. The bodies $2t$ and $2b$ are thus arranged head to foot in contact with one another, without wasted space.

As FIGS. 1 to 4 show, the stowing apparatus comprises:

a first impulsion means 8 and a first deflecting device 9, which are disposed vertically in line with one another, in alignment with a body 2 when the turntable extending between them is stopped (FIG. 2), a second impulsion means 10 and a second deflecting device 11, which are disposed vertically in line with one another and in aligment with another body 2 on the turntable (FIG. 2), the thrower and deflecting assembly 8,9 being parallel to the thrower and deflecting assembly 10,11.

The impulsion means 8 and 10 are intended for throwing the bodies 2 upwards and may consist of a compressed air nozzle, a jack a spring pusher, and so on. They are mounted on a fixed plate 12 forming part of the frame 13 which supports the turntable 1 and the supply and filling systems.

The deflecting devices 9 and 11 are mounted on brackets 14 (FIG. 3) and 15 (FIG. 4) on said frame, which also supports inclined ramps 16 and 17 intended to receive the bodies $2t$ and $2b$ after they have been deflected.

In the embodiment illustrated in FIGS. 3 and 4 the diverter device 9 is a resilient closure, controlled opening pivoting gripper, and the deflecting device 11 is a fixed concave ramp.

In the example illustrated in FIG. 3, the gripper 9 comprises two jaws 18 and 19 which at their top end are mounted for pivoting about a pin 20 on the fixed bracket 14. The jaws delimit mutually facing cavities 21, 22 forming a space which, when the gripper is in the waiting position shown in solid lines (FIG. 3), will receive and hold any body 2 thrown up by the means 8. These jaws are held closed, in order to grip the body, by a spring 23 the ends of which are attached to them, although this spring does not oppose the opening of said jaws when they are driven open either by the action of the body 2 thrown up during its penetration into the sloping inlets 24 of the jaws, or by a ram 25 or other operating means. The ram 25 bears against the fixed bracket 14 and its movable part, such as the piston rod, passes through the jaw 18, which may be called the rear rod in relation to the direction F of the pivoting movement, and is articulated about a pin 26 on a projection 28 on the front jaw 19. In addition, the rear jaw 18 is provided with a screw 27 forming an adjustable stop cooperating at the end of the pivoting movement with a fixed stop 29 on the bracket 14. The position of the front jaw 19 at the end of the pivoting movement is determined by the end of the stroke of the ram 25. This position may obviously be determined positively by contact between the projection 28, or an adjustable screw provided on it, and a stop 30 on the bracket 14. On the pivoting of the gripper 9 in the direction of the arrow F, the stop screw 27 comes into contact with the stop 29, so that the rear jaw 18 is locked. The front jaw 19 continues its movements, its stopping being determined by the ram in the example illustrated. The gripper 9 consequently opens against the antagonistic action of the spring 23, and frees the body 2 previously held fast. This body, being liberated, falls substantially in accordance with the inclination of the rear jaw 18 and drops onto the inclined ramp 16 with its thin end 4 at the front. From now on it will be considered as a "head" body in its manipulation. The ram 25 then pivots the front jaw 19 in the opposite direction to that of the arrow F, and the spring 23 retracts. When the gripper 9 is closed, the stop 27 moves away from the stop 29 and the rear jaw 18 pivots together with the front jaw 19, with the gripper closed.

In the abovedescribed embodiment the diverter assembly comprises not only the pivoting gripper 9 cooperating with the thrower 8, but also the fixed concave ramp 11 cooperating with the thrower 10.

In the example illustrated in FIG. 4, the ramp 11 has a single concave profiled edge 31, the bottom end 32 of which is tangent to the vertical throwing trajectory of the body 2, and the concave curvature of which follows a rising path in the direction of the arrow F. The body 2 thrown up the thrower 10, like the one thrown up by the thrower 8, is consequently deflected towards the outside of the feed turntable 1 but, whereas the body 2t falling freely from the gripper 9 onto the inclioned ramp 16 moves with its thin end 4 at the front, the "foot" body 2b falling freely from the concave ramp 11 onto the inclined ramp 17 moves with its wide end 3 at the front.

The inclined ramps 16 and 17 are disposed side by side and feed the bodies 2b, 2t disposed head to foot to two distribution conveyors 33 and 34, which are of different lengths in order to take into account the different operating times of the gripper 9 and the concave ramp 11 which effect the deflection.

Modified forms of construction of the deflecting devices cooperating with the impulsion means 8 and 10 can of course be used.

Figure 5:
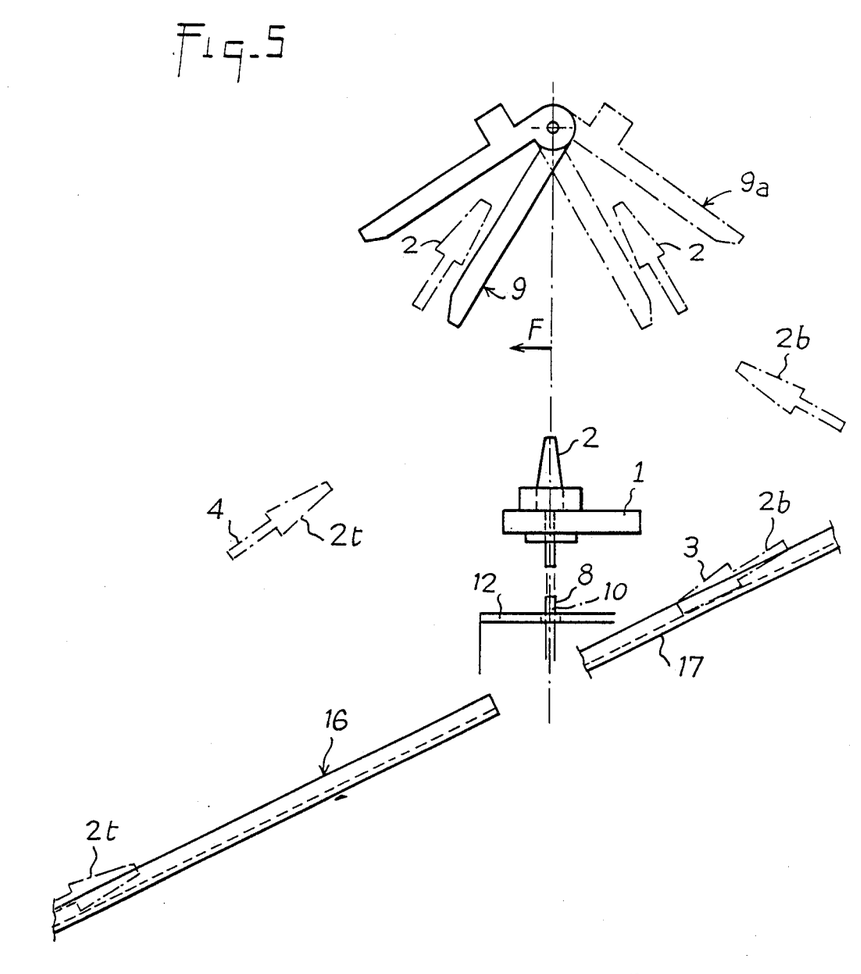
FIG. 5 is a view corresponding to the superimposition of FIGS. 3 and 4, relating to a first variant form of construction of the set of throwing and deflecting devices.

In a first variant, illustrated in FIG. 5, the deflecting devices consist of:

a first gripper 9, such as that described in connection with FIG. 3, mounted vertically in line with the thrower 8, this gripper being shown in solid lines, and a second gripper 9a extending symmetrically with said first gripper and vertically in line with the thrower 10, this second gripper being shown in dash-dot lines.

Consequently, the gripper 9 deflects each body 2 in the direction of the arrow F and allows this body 2t to fall onto the inclined ramp 16 with its thin end 4 directed forwards. On the other hand, the gripper 9a deflects each body 2 in the opposite direction to that of the arrow F and allows this body 2b to fall onto the inclined ramp 17 with its wide end 3 directed forwards.

The ramp 17 does not here start at the same point as the ramp 16. Particularly for this reason, and although the time required for deflection by the two grippers 9 and 9a is substantially the same, the ramps 16 and 17 and the conveyors 33 and 34 extending them supply bodies 2t and 2b disposed head to foot to transfer devices 35 and 26 which, as in the previous case, are relatively distant from one another.

Figure 6:
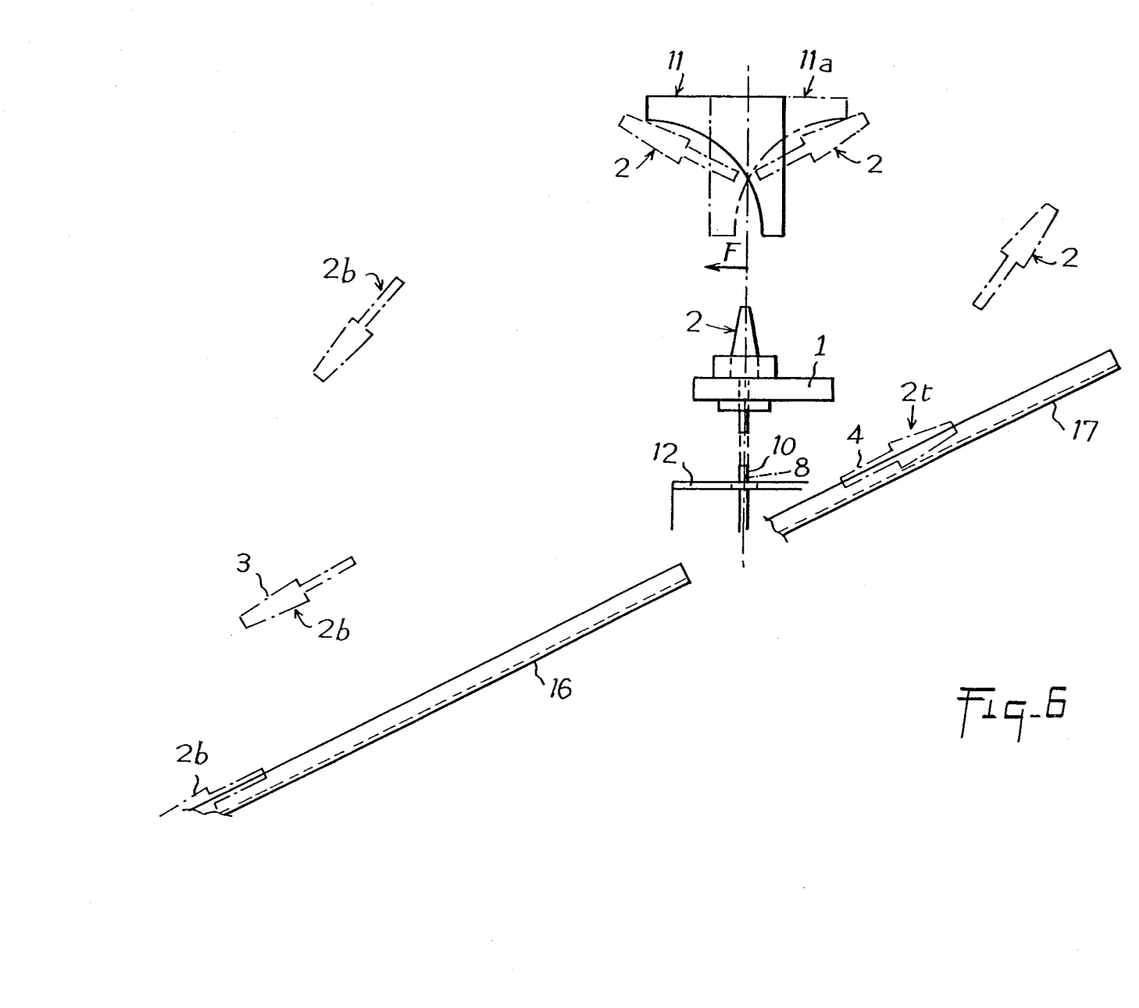
FIG. 6 is a similar view to FIG. 5 relating to a second variant form of construction of the set of throwing and deflecting devices.

According to a second variant illustrated in FIG. 6, the deflecting devices consist of:

a first fixed concave ramp 11, which is of the kind described above with reference to FIG. 4 and which is mounted vertically in line with the thrower 10, this ramp being shown in solid lines, and a second fixed concave ramp 11a extending symetrically with said first ramp and vertically in line with the thrower 8, this ramp being shown in dot-dash lines.

The ramp 11 consequently deflects each body 2 in the direction of the arrow F, and this body 2b falls freely onto the inclined ramp 16 with its wide end 3 directed forward. On the other hand, the ramp 11a deflects each body 2 in the opposite direction to that of the arrow F, and this body 2t falls freely onto the inclined ramp 17 with its thin end 4 directed forward.

In this second variant the arrangement of the ramps 16, 17 the conveyors 33, 34, and the transfer devices 34,36 is similar to that used in the first variant. However, both in the case of the variant shown in FIG. 5 and in the case of that shown in FIG. 6 it is necessary for the bodies 2b and 2t falling from the diverter devices 9a and 11a situated on the inner side, in relation to their outward movement (arrow F), should be able to fall freely to arrive on the inclined ramp 17 without the feed device being able to hinder this.

If this feed device is the turntable 1 described above, it must have openings for the passage of the freely falling bodies 2b (FIG. 5) and 2t (FIG. 6). However, there is no reason for said device not to be an annular crown guided on a peripheral running path, or an endless chain which is rectilinear in its operative feed movement.

In addition to the thrower and deflecting assemblies 8 to 11, 9a, 11a, the stowing apparatus according to the invention incorporates a packing apparatus which, as can be seen in FIG. 1, comprises two delivery conveyors 37 and 38 fed with oblong bodies 2b and 2t by the transfer devices 35 and 36 which cooperate with the distribution conveyors 33 and 34. The delivery conveyors 37, 38 for the oblong bodies extend at right angles to the distribution conveyors 33, 34 and on each side of a conveyor 39 which is provided for packages 5 and to which they are parallel. As shown in FIG. 13, the bodies 2b and 2t have their axes slightly inclined in relation to the axis of the rib 7 in the packages 5, in order to be perfectly stowed without wasted space. Consequently, the same inclination is given to the bodies 2t and 2b delivered by the conveyors 37 and 38, in relation to the arrow $F_1$.

In view of the fact that each package 5 contains three bodies 2t and three bodies 2b, the packing apparatus is also provided with two manipulator arms 40 and 41 whose ends adapted to move between the conveyors 37, 38 and the conveyor 39 are equipped with gripping means 42 and 43 enabling each of them to pick up three bodies simultaneously. In the example illustrated the manipulator arms are pneumatic rams and their gripping means are vacuum suction cups.

The bodies 2t and 2b must of course be arranged on the conveyors 37 and 38 with the same spacing and the same inclination as in the packages 5, and the arrangement is offset by half a space in one conveyor relative to the other.

Figure 11:
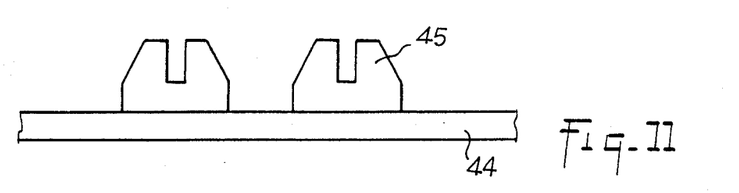
Figure 12:
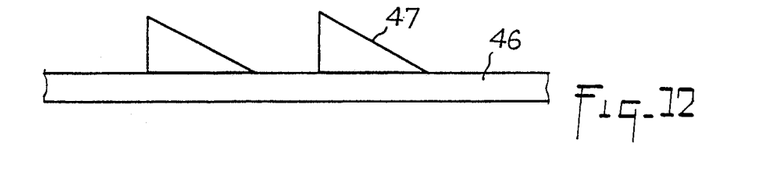

The conveyors 33, 34 and 39 may be of any type; however, the endless belt type appears to be preferable. For each of the two conveyors 37, 38 it is necessary to dispose on the edges positioning means (FIGS. 11 and 12) which precisely enable the aforesaid spacing and inclination to be determined. Consequently, these conveyors 37, 38 may comprise a continuous belt or two edge chains or other means, but, whatever type is chosen, the inner edge 44 of said conveyors has notched projections 45 (FIG. 11) enabling the thin end 4 of the oblong bodies 2 to be centered, while their outer edge 46 has sloping projections 47 (FIG. 12) enabling the bodies 2 to be inclined by sliding action on their wide end 3.

As has been stated above, a transfer device 35 is interposed between the distribution conveyor 33 and the delivery conveyor 37 (FIG. 1).

Figure 7:
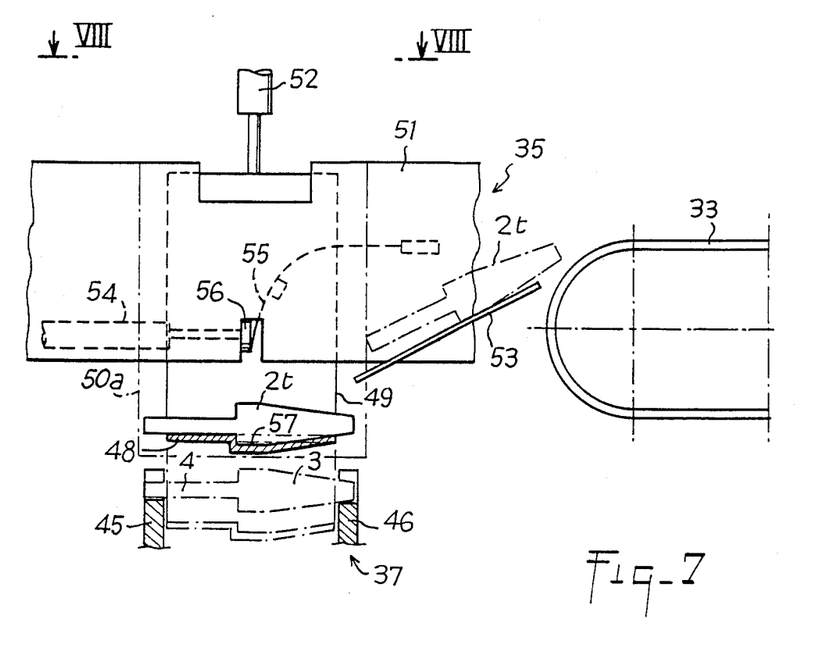
FIG. 7 is a partial view in section on a larger scale, taken on the line VII—VII in FIG. 1, illustrating one of the two transfer devices used in the stowing apparatus between the station effecting the head to foot arrangement and the packing station.
Figure 8:
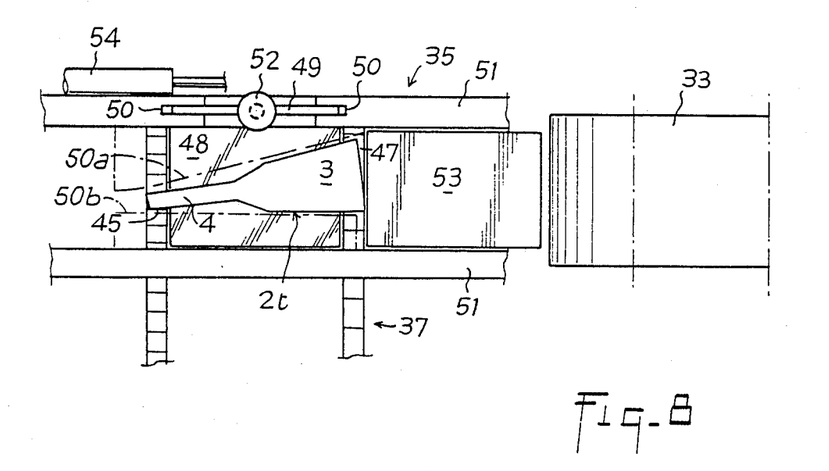
FIG. 8 is a partial plan view taken on the line VIII—VIII in FIG. 7, FIGS. 9 and 10 are views similar to FIGS. 7 and 8, showing the second transfer device, the section in FIG. 9 being taken on a larger scale on the line IX—IX in FIG. 1, and the plan view in FIG. 10 being taken on the line X—X in FIG. 9, FIGS. 11 and 12 are partial views of details taken on a larger scale on the lines XI—XI and XII—XII respectively in FIG. 10.

As shown in FIGS. 7 and 8, the transfer device 35 comprises an elevator plate 48 integral with an upright 49 guided for vertical translation in slide guides 50 on one of the two plates 51 of a part of the fixed frame 13. An operating device 52, such as a cam, is connected to this movable assembly 48, 49 to enable the plate 48 to occupy;

a top position shown in solid lines in FIG. 7, in which position it can receive any body 2t carried, with its thin end 4 at the front, by the conveyor 33 and delivered by an inclined ramp 53, the plate 48 then being situated above the conveyor 37, and a bottom position which is shown in dot-dash lines in FIG. 7 and in which it is situated below the level for deposition of the body 2b in question on the conveyor 37.

The bodies 2t which arrive on the plate 48 are correctly directed but not perfectly aligned. It is necessary to effect this alignment, and for this purpose a vibrator means is used during the downward movement of the plate. In the example illustrated this means comprises a ram 54 and a flexible blade 55 carried by the plate 51 provided with slide guides 50, the upright 49 of the plate 48 having a projection 56 which in the top position is interposed between the rod of the ram and the flexible blade.

In the form of construction shown in solid lines in FIGS. 7 and 8, in order to ensure that all the bodies 2t will be aligned through the action of the vibrations supplied by the system 54, 55 during operation and transmitted by the plate 48, the latter is provided with a positioning means in the form of an at least partial cavity 57.

In the variant shown in dot-dash lines in the same FIGS. 7 and 8, the plate 48 is flat and the plates 51 are provided with guides 50a and 50b extending parallel, with a certain clearance, to the edges of the body to be aligned.

After the body 2t has been positioned, the plate 48 moves downwards while vibrating, and a presser means, such as a pneumatic ram, compressed air nozzles, or other means, holds this body on the plate. During this downward movement the thin end 4 of said body is centered in a notch 45 in the conveyor 37 and the wide end 3 is supported on the associated slope 47, which inclines said body. The plate 48 moves slightly further downward than this level of deposition of the body 2t, and consequently the conveyor 37 can advance one space, and the plate 48 can then rise to the top position to receive another body 2t.

In the same way as was described with reference to FIGS. 1, 7 and 8, a transfer device 36 is interposed between the distribution conveyor 34 and the delivery conveyor 38.

Figure 9:
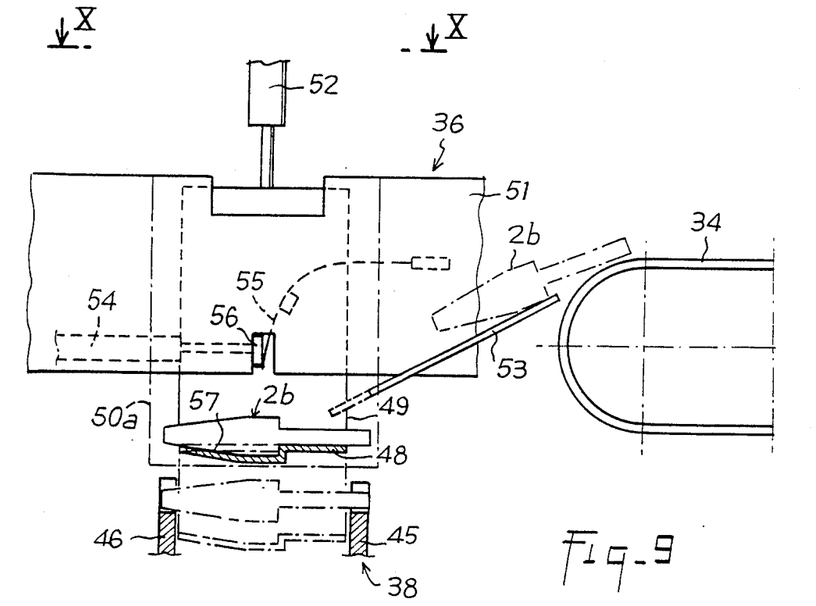
Figure 10:
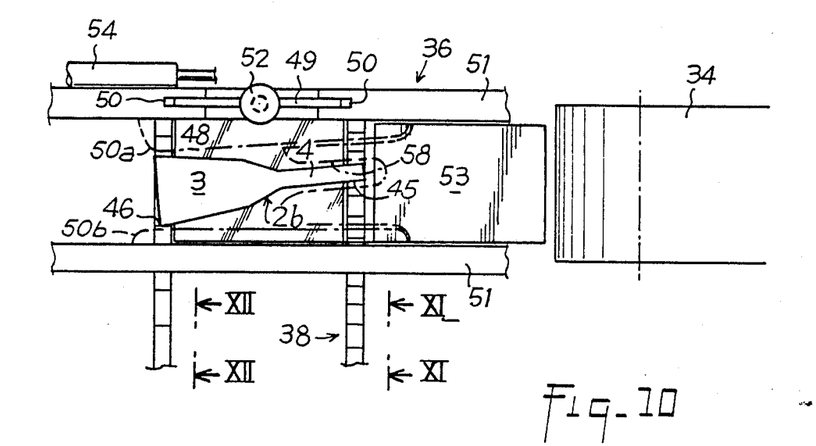

The transfer device 36 illustrated in FIGS. 9 and 10 is identical to the transfer device 35 described above with reference to FIGS. 7 and 8. All its components are therefore given the same reference numerals and will not be described again. The only difference is that in the variant shown in dot-dash lines the inclined ramp 53 is extended slightly further above the plate 48 and delimits a cutout 58 for guiding the thin end 4 of the oblong bodies 2b.

I claim:

1. A process for arranging a plurality of dissymmetrical oblong bodies, each body having a head and a foot, so that adjacent bodies are disposed in a head-to-foot relationship, comprising:
   placing a plurality of bodies side by side on a table, all of said bodies being oriented in a single direction;
   consecutively projecting pairs of said bodies from the table vertically and deflecting said pairs of bodies onto first and second guide members so that one of each of said pairs of bodies is oriented in a first direction on the first guide member, while the other of each of said pairs of bodies is oriented in a second and opposite direction on the second guide member;
   guiding a first set of bodies from the first guide member and a second set of bodies from the second guide member side by side to a packing station; and
   packing the bodies so that the bodies from the first set of bodies alternate with the bodies from the second set of bodies, with the bodies of the first set of bodies being oriented opposite to the bodies of the second set of bodies.

2. The process as claimed in claim 1, wherein said pairs of bodies are projected parallel to each other in the same direction.

3. The process as claimed in claim 1, further comprising:
   aligning the first set of bodies parallel with each other by positioning each body of the first set of bodies on a positioning member and then depositing each body of the first set of bodies on a first movable conveyor with a first predetermined space between each body of the first set of bodies; and
   aligning the second set of bodies parallel with each other by positioning each body of the second set of bodies on a positioning member and then depositing each body of the second set of bodies on a second movable conveyor with a second predetermined space between each body of the second set of bodies;
   wherein said packing step comprises transferring a plurality of bodies from said first set of bodies to a package and transferring a plurality of bodies from said second set of bodies to the package so that the bodies from said second set of bodies are disposed in the first predetermined space between the bodies from the first set of bodies.

4. An apparatus for arranging a plurality of dissymmetrical oblong bodies, each body having a head and a foot, so that adjacent bodies are disposed in a head-to-foot relationship, comprising:
   feeding means for supporting said bodies vertically, all of said bodies being oriented in a single direction;
   propelling means for consecutively propelling pairs of said bodies vertically from said feeding means;
   first and second reception ramps;
   deflecting means for deflecting one of each pair of bodies onto said first reception ramp at a first orientation, and for deflecting the other of each pairs of bodies onto said second reception ramp at a second and opposite orientation, the bodies on the first reception ramp defining a first set of bodies and the bodies on the second reception ramp defining a second set of bodies;
   packing means for packing the bodies so that the bodies from the first set of bodies alternate with the bodies from the second set of bodies, with the bodies of the first set of bodies being oriented opposite to the bodies of the second set of bodies.

5. The apparatus as claimed in claim 4, wherein said propelling means comprises first and second vertical impulsion devices located below the feeding means and said deflecting means comprises first and second deflecting devices located above the feeding means and directly above the first and second impulsion devices, respectively, wherein said first deflecting device deflects free-falling bodies onto the first reception ramp, and said second deflecting device deflects free-falling bodies onto the second reception ramp.

6. The apparatus as claimed in claim 5, wherein at least one of said deflecting devices comprises a pivoting gripper which can selectively grip and release one of the bodies.

7. The apparatus as claimed in claim 6, wherein said pivoting gripper comprises:
   a front jaw and a rear jaw mounted at one end to a pin, said jaws being pivotable relative to each other around said pin and defining a receiving cavity therebetween which can receive one of the bodies;
   a resilient member which biases said jaws together;
   an operating device attached to the front jaw which causes the front jaw to rotate; and
   a stop which allows the rear jaw to rotate only over a limited range;
   wherein when said operating device causes the front jaw to rotate over the limited range, the rear jaw rotates with the front jaw, but when the front jaw rotates past the limited range, the stop stops the rotation of the rear jaw so that the jaws separate.

8. The apparatus as claimed in claim 5, wherein at least one of said deflecting devices comprises a fixed concave ramp which can deflect the bodies.

9. The apparatus as claimed in claim 5, wherein said feeding means comprises a rotating turntable which supports the bodies along an outer periphery thereof, and said reception ramps are inclined downwardly toward the packing means from the rotating turntable at the same slope, and wherein the first deflecting device is a pivoting gripper which can selectively grip and release one of the bodies and the second deflecting device is a fixed concave ramp which can deflect the bodies, said deflecting devices deflecting the bodies radially away from the rotating turntable.

10. The apparatus as claimed in claim 5, wherein said feeding means comprises a rotating turntable which supports the bodies along an outer periphery thereof, said rotating turntable having an axis and an open space disposed radially inside the outer periphery thereof, and wherein said first and second deflecting devices are pivoting grippers which can selectively grip and release one of the bodies, said first deflecting device deflecting the bodies radially way from the rotating turntable and onto the first reception ramp, said second deflecting device deflecting the bodies radially toward the axis of the rotating turntable, through the open space in the turntable, and onto the second reception ramp.

11. The apparatus as claimed in claim 5, wherein said feeding means comprises a rotating turntable which supports the bodies along an outer periphery thereof, said rotating turntable having an axis and an open space disposed radially inside the outer periphery thereof, and wherein said first and second deflecting devices are fixed concave ramps which can deflect the bodies, said first deflecting device deflecting the bodies radially way from the rotating turntable and onto the first reception ramp, said second deflecting device deflecting the bodies radially toward the axis of the rotating turntable, through the open space in the turntable, and onto the second reception ramp.

12. The apparatus as claimed in claim 4, further comprising:
   first and second conveyor means which carry the first and second sets of bodies, respectively, to the packing means;
   first transfer means which transfers the first set of bodies from the first reception ramp to the first conveyor means, said first transfer means comprising a first elevating plate which can receive a body at an upper position and which is movable to a lower position where the body is deposited on the first conveyor means, first guide means for orienting the body in an exact position on said first elevating plate, and first vibrating means for vibrating said first elevating plate; and
   second transfer means which transfers the second set of bodies from the second reception ramp to the second conveyor means, said second transfer means comprising a second elevating plate which can receive a body at an upper position and which is movable to a lower position where the body is deposited on the second conveyor means, second guide means for orienting the body in an exact position on said second elevating plate, and second vibrating means for vibrating said second elevating plate.

13. The apparatus as claimed in claim 12, wherein said first guide means comprises a cavity in the first elevating plate, and the second guide means comprises a cavity in the second elevating plate.

14. The apparatus as claimed in claim 12, wherein said first and second guide means each comprise fixed opposing guide walls.

15. The apparatus as claimed in claim 12, wherein said first transfer means comprises a first inclined feed ramp which feeds a body onto the first elevating plate, said second transfer means comprises a second inclined feed ramp which feeds a body onto the second elevating plate, and said first and second guide means comprise a cutout located in said first and second feed ramps, respectively.

16. The apparatus as claimed in claim 12, wherein said first conveyor means comprises a first conveyor, first notches located along one lateral edge of the first conveyor, and first slopes located along an opposing lateral edge of the first conveyor, said first notches and slopes serving to incline the first set of bodies on the first conveyor, and wherein said second conveyor means comprises a second conveyor, second notches located along one lateral edge of the second conveyor, and second slopes located along an opposing lateral edge of the second conveyor, said second notches and slopes serving to incline the second set of bodies on the second conveyor.

17. The apparatus as claimed in claim 12, wherein said packing means comprises a first manipulator arms having first gripping means attached thereto which can pick up bodies off the first conveyor means and deposit them in a package, and second manipulator arms having second gripping means attached thereto which can pick up bodies off the second conveyor means and deposit them in the package.

* * * * *